Figure 1:
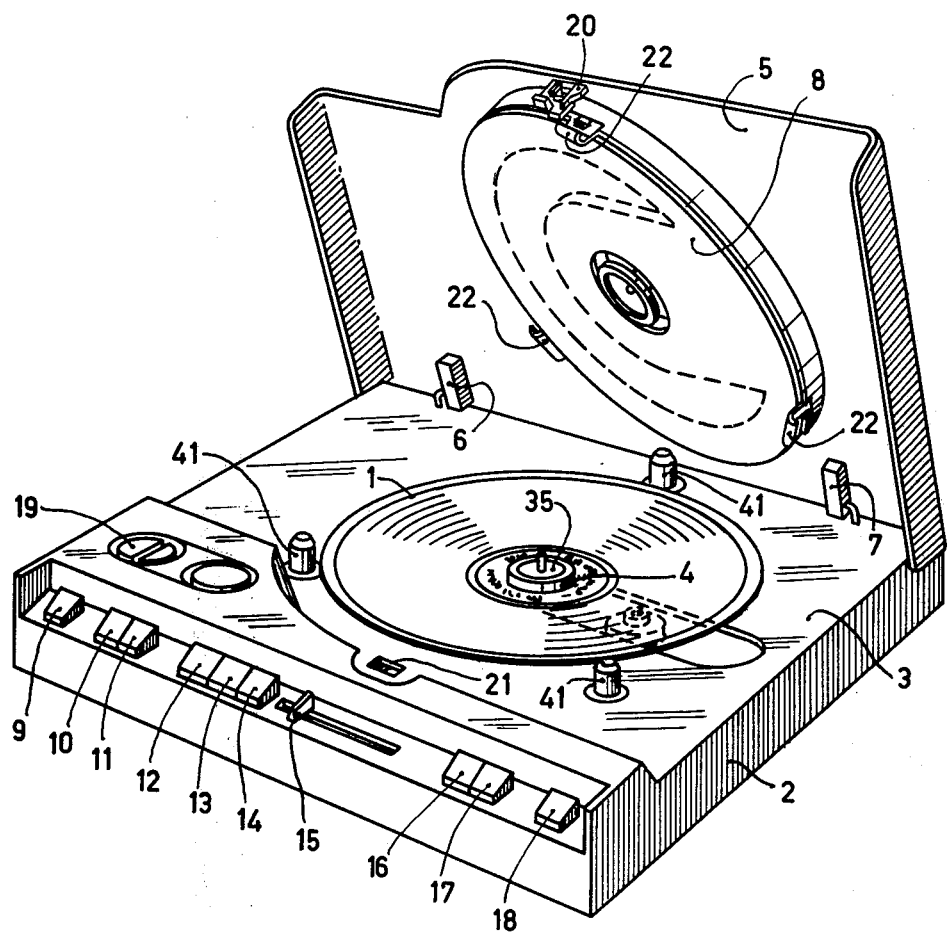

United States Patent [19]

Tops et al.

[11] 4,158,867
[45] Jun. 19, 1979

[54] VIDEO DISC PLAYER

[75] Inventors: Adrianus C. Tops, Eindhoven; Johannes A. Iemenschot, Zwolle, both of Netherlands

[73] Assignee: U.S. Philips Corporation, New York, N.Y.

[21] Appl. No.: 905,879

[22] Filed: May 15, 1978

[30] Foreign Application Priority Data

Feb. 10, 1978 [NL] Netherlands ............... 7801533

[51] Int. Cl.² .................................................. G11B 5/52
[52] U.S. Cl. .......................................... 360/99; 360/86; 360/133; 358/128
[58] Field of Search ............... 360/99, 98, 86, 133, 360/135, 137; 358/128; 274/9 R, 42 R

[56] References Cited

U.S. PATENT DOCUMENTS 3,863,266  1/1975  Hoshino ................................ 360/86
4,002,826  1/1977  Iemenschot ......................... 358/128

Primary Examiner—John H. Wolff
Attorney, Agent, or Firm—Thomas A. Briody; William J. Streeter; Simon L. Cohen

[57] ABSTRACT

A video disc player is provided with a stabilizing disc which during playing is disposed at a small distance above the video disc, air being admissible through an inlet restriction between the stabilizing disc and the video disc so that locally a sub-atmospheric pressure is produced as a result of the centrifugal pumping action of the video disc. In order to prevent the video disc from being drawn along when the stabilizing disc is moved upwards, an air by-pass passage is provided which via air-valve means can be opened when playing of the video disc is terminated, so as to admit an increased air stream between the stabilizing disc and the rotating video disc in order to at least substantially eliminate the prevailing sub-atmospheric pressure.

3 Claims, 4 Drawing Figures

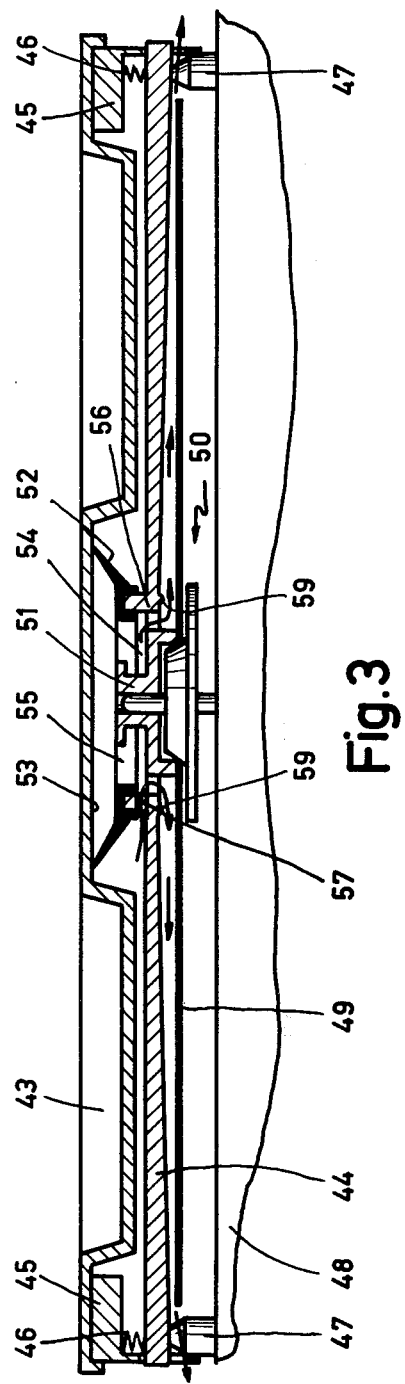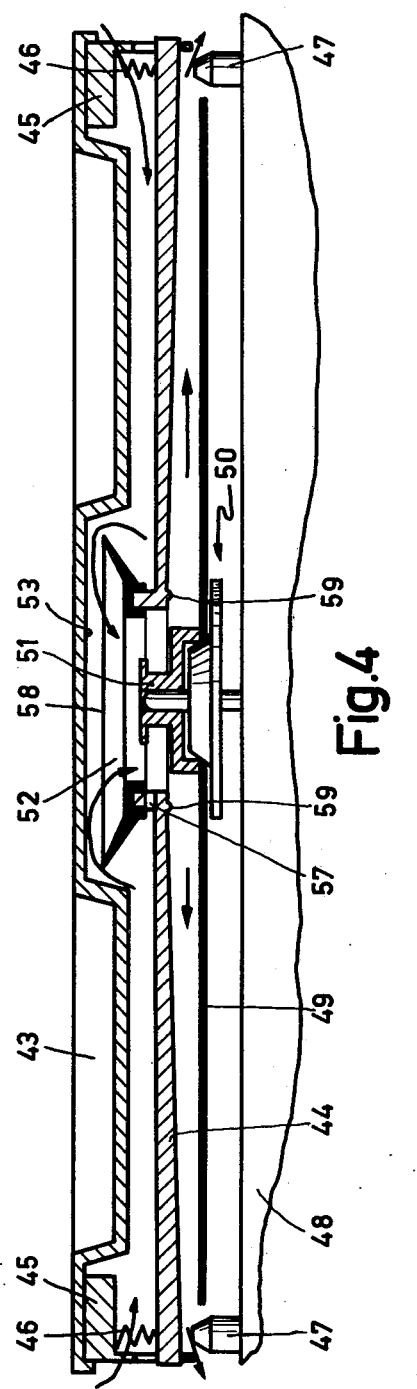

VIDEO DISCPLAYER

The invention relates to a video disc player for playing back round rapidly rotating video discs and comprising: a housing with a deck plate; a motor-driven drive spindle, which projects from the deck plate for rotating a video disc parallel to the deck plate; a stabilising disc, which is movable between a first and a second position, and which in last-mentioned position at least substantially covers a video disc placed on the drive spindle, for stabilizing the shape of a video disc during rotation, which stabilizing disc in its second position extends substantially perpendicularly to the drive spindle axis and is disposed at a small distance from a video disc which is disposed on the drive spindle; means comprising at least one air-inlet restriction for, during playback of a video disc, admitting an air stream which is limited to a specific magnitude between the stabilizing disc and the rotating video disc and thus locally creating a partial vacuum.

In recent years video-disc systems are being developed at an accelerated pace. A video disc system consists of a round video disc, which in respect of its dimensions largely corresponds to the well-known audio longplaying discs, a video disc player for rotating and optically reading the video information contained on the video disc, as well as a television set to which the video information is applied in suitable form and in the appropriate manner so as to enable the video program to be displayed on the picture tube of the television set. The reason of the accelerated development is that as a result of novel technical developments suitable light sources have become available for reading extremely fine information structures (the so-called laser), as well as the availability of integrated electronic circuits which within a small volume and at an acceptable price are capable of processing the large flow of discontinuous signals, obtained by reading the discontinuous information structure on the video disc, and converting these signals into electrical video signals which are suitable for application to the aerial input of television sets intended for domestic use. For a more comprehensive description of a video disc system reference is made to a series of articles relating to the subject "The Philips VLP System", in Philips Technical Review 33, pages 178–193, volume 33, 1973, no. 7. The revolution rate of the video disc is 25 or 30 Hz, depending on whether the mains frequency is 50 or 60 Hz. The disc has a diameter of approximately 30 cm and may have a thickness of approximately 1.1 mm.

A disc of 1.1 mm thickness still has sufficient rigidity to enable it to be handled without any problems. However, under certain circumstances it may also be advantageous to use even thinner discs, for example discs consisting of a thin flexible foil. The discs are provided with a reflecting layer at the location of the information structure and are optically read in reflection. For this purpose the video disc player is equipped with an objective, which, for the purpose of automatic focussing of a laser beam to a read spot on the information structure, is capable of performing automatic correction movements in the axial direction by means of a suitable servo circuit. Obviously, it is of advantage when a minimum number of correction movements, which are as small as possible, are necessary for keeping the objective in focus. When video discs of the said thickness of 1.1 mm and thinner are used, it may therefore be of advantage to use disc stabilization when the disc is being played, in order to at least partly prevent undesired elastic undulation effects in the disc, in particular near its circumference. For this purpose a stationary stabilizing disc may be employed, which is located in a cover which is kept closed during playing of the video disc and which then extends over the rotating video disc. In order to obtain a correct distance between the stationary stabilizing disc and the rotating video disc use may for example be made of a stabilizing disc which is connected to the cover so as to be axially resilient and which when the cover is closed is resiliently urged against a plurality of stops on the deck plate (see Applicant's U.S. Pat. No. 4,002,826 issued Jan. 11, 1977). During playing air is admitted through a plurality of openings between the rotating video disc and the stabilizing disc. The openings function as an air-inlet restriction which during playing restrict the magnitude of the air stream which is admitted, so as to create a partial vacuum between the stabilizing disc and the rotating video disc.

Obviously the drive spindle should be accessible when a video disc is to be placed on the video disc player and also when the video disc is to be removed from the video disc player. This means that the stabilizing disc, which during playing of the video disc is located at a small distance above the video disc in the plane parallel to the said disc, should be movable. In the video disc player which is known from the said U.S. Pat. No. 4,002,826 the movability of the stabilizing disc is obtained by pivotally connecting the cover, to which the stabilizing disc is resiliently connected, to the housing on one of its sides.

In view of the comparatively high speed with which the video disc rotates it is essential for reasons of safety that steps are taken which prevent the stabilizing disc from being movable relative to the rotating video disc as long as said video disc still rotates at an unsafe speed. This is because it should be avoided that the rapidly rotating disc jumps off the drive spindle. In the video disc player in accordance with the said U.S. Pat. No. 4,002,826 the video disc is placed on a frustoconical end of the drive spindle with its central opening against which end it is pressed with the aid of a magnetic disc loading device during playing. When the cover is fully opened the disc loading device is also removed, so that the disc is freely positioned on the conical locating surface. Slight imbalances may give rise to a slight radial displacement of the edge of the central hole in the disc over the conical locating surface, after which the centrifugal forces which are exerted on the disc will increase, so that the disc, which is rotating, is flung off the drive spindle. When a stabilizing disc is employed this increases the risk of the rotating video disc being flung off. This is because during playing of the video disc a sub-atmospheric pressure exists between the stabilizing disc and the video disc, so that when the cover is opened the upward movement of the stabilizing disc produces a suction effect as a result of which the video disc is drawn along.

Therefore, an important safety precaution for video disc players is that by which the cover and thus the stabilizing disc, is latched in the playing position during playing of the video disc, unlocking from the playing position automatically causing activation of a brake for braking and completely or almost completely bringing the drive spindle to a standstill before the cover can be opened completely. Such a safety precaution is described in the U.S. Pat. No. 4,032,971 issued June 28, 1977. In accordance with this known safety precaution the disc player is provided with a cover which carries a latching member at the front, which member is provided with some cams. The cover can be unlatched by the actuation of an unlatching member. As a result of this a latching pawl is moved via a sliding rod and the cover is only unlatched to a limited degree, namely up to a position in which it cannot yet be opened further by hand, because this is prevented by an additional safety cam on the latching member. However, in this position the latching member releases the brake leaver, which is spring-loaded towards a braking position, which results in the drive spindle with the video disc placed on it being braked via a band brake. This provision is reliable, because the spring fully independently ensures mechanical actuation of the brake when the cover is moved. Since for braking the rapidly rotating video disc some time is needed, there is provided a further safety precaution which retards the further movement of the said slide as long as the speed of the drive spindle has not dropped below an acceptable low value. For this use is made of a damping element, which is slowly moved by a spring during the time needed for braking. After the necessary time has elapsed the latching member is released, upon which the cover can be opened further by hand.

The movement of the cover and thus of the stabilizing disc from the playing position into the partially unlatched position is effected with pressure spring. A consequence is that the movement is performed comparatively abruptly, which may give rise to undesired situations. During the abrupt upward movement the video disc may be drawn upwards by the stabilizing disc as a result of the previously described suction effect and could thus be lifted off the drive spindle, which could give rise to substantial damage to the video disc player.

It is the object of the invention to provide a solution to the problems as a result of the suction effect and the invention is therefore characterized in that there are provided air-valve means, which comprise a valve body and a valve seat, for the closure of an air by-pass passage during playing of a video disc and for opening the air by-pass passage when playing of a video disc is discontinued, so as to admit an increased air stream between the stabilizing disc and a rotating video disc in order to at least substantially eliminate the locally prevailing sub-atmospheric pressure and to prevent the video disc from being drawn along when the stabilizing disc is moved from its second to its first position.

In a video disc player in which the stabilizing disc is mounted in a cover, which is movable between an open position and a closed position, so that said disc is axially movable to a limited extent against spring force, and a plurality of stops are disposed on the deck plate and for, when the cover is closed co-operating with the stabilizing disc against the spring force, which disc is movable over some distance, i.e. a video disc player in accordance with the previously mentioned U.S. Pat. No. 4,002,826, it is advantageous to use an embodiment of the invention which is characterized in that the said air valve means are connected both to the stabilizing disc and the cover, the valve body and the valve seat closing the air bypass passage when the cover is closed and the air bypass passage between the valve body and the valve seat being opened when the cover is opened as a result of the axial movement of the stabilizing disc relative to the cover.

In accordance with a further embodiment of the invention the valve body may for example consist of a flexible plastics member which co-operates with a contact surface which is connected to the cover by an annular sealing surface.

In this embodiment of the invention use is made of the limited axial movability of the stabilizing disc, which is necessary to ensure that it can be pressed resiliently against the stop pins on the disc-player deck. When the cover of the video disc player is raised the stabilizing disc initially performs a small axial movement relative to the cover, after which the stabilizing disc looses contact with the stops on the deck. During the initial small axial displacement, the airvalve means are actuated, so that the sub-atmospheric pressure between the stabilizing disc and the video disc is eliminated. Upon a further movement of the stabilizing disc, i.e. when it leaves the stops, a suction effect is no longer possible.

Although in the foregoing the effect of the invention is described for a video disc player in which the stabilizing disc is connected to the cover and is resiliently movable relative to the cover over a limited axial distance and co-operates with stop pins on the deck of the video-disc player, i.e. a video disc player in accordance with U.S. Pat. No. 4,002,826, the invention is also generally applicable to other video disc players which are provided with a stabilizing disc. As an example the invention may be used in video disc players which have no cover at all, but in which the stabilizing disc is pivotable over the video disc with the aid of an arm which is mounted on the deck plate and is fixed in this position during playing. Neither need such a video disc player be provided with means for braking the drive spindle during removal of the video disc. The steps in accordance with the invention are also of importance in such a video disc player, so as to prevent the video disc from being drawn along when the stabilizing disc is pivoted away.

Figure 2:
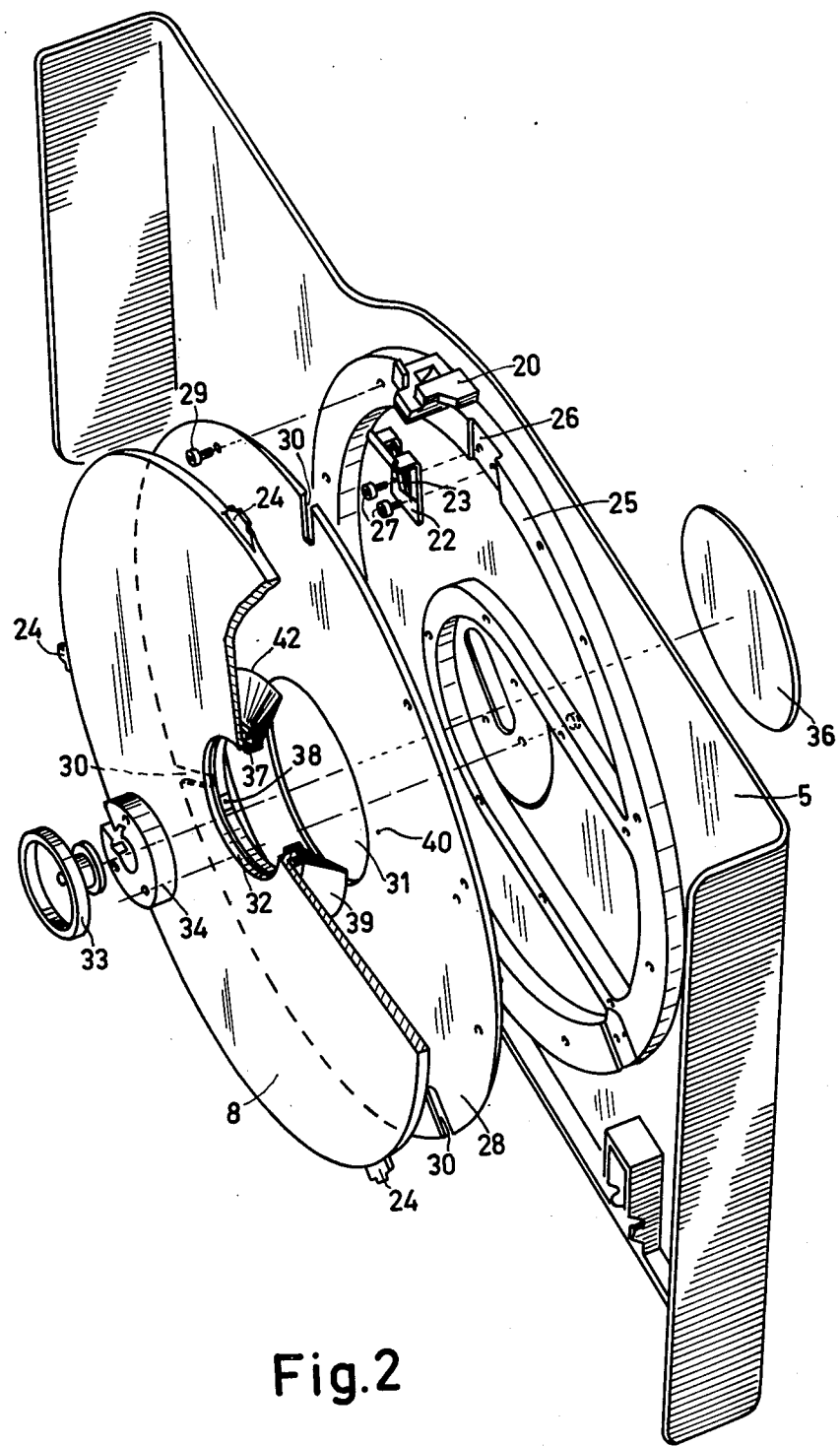

The invention will now be described in more detail with reference to the drawing, in which:

FIG. 1 shows a perspective view of a video disc player provided with a cover with a resilient stabilizing disc, FIG. 2 shows an emploded view of the cover with the associated components of the video disc player of FIG. 1, FIG. 3, in order to illustrate the operation of the invention, shows a schematical cross-section over the drive spindle of a video disc player similar to that of FIG. 1, the cover being closed and a video disc being disposed on the rotating drive spindle, and FIG. 4 again shows the cross-section of FIG. 3, but now in the situation in which the cover has been moved over a certain distance.

The video disc player in accordance with FIG. 1 is adapted to play round rapidly rotating video discs, such as the video disc 1 which is shown. The player comprises a housing 2 with a deck plate 3. Above the deck plate the end 4 of a motor-driven drive spindle projects, which drive spindle rotates the video disc parallel to the deck plate 3. Near a long side of the housing 2 a cover 5 is pivotally connected to the housing with the aid of two friction hinges 6 and 7. The cover is movable between a fully opened first position, shown in the Figure, and a fully closed second position, not shown. In the cover a resiliently movable stabilizing disc 8 is mounted for stabilizing the shape of the video disc 1 during its rotation. The stabilizing disc is movable with the cover between the said first and second positions of said cover, the stabilizing disc at least substantially covering the video disc 1 on the drive spindle 4 in the second position and extending perpendicularly to the drive spindle axis at a small distance from the video disc.

At the front of the housing there are located a plurality of controls 9 through 18 for controlling the various apparatus functions. On top of it there is located an unlatching button 19, which can be slid in a lateral direction by hand. At its side which is remote from the hinges 6 and 7 the cover carries a latching member 20 which, when the cover is closed, engages with a recess 21 in the deck 3. With the aid of the latching member 20 the cover can be latched in its closed second position. Unlatching is effected by actuation of the unlatching button 19, which via a sliding rod co-operates with a latching member 20, so as to release the cover at least to a limited extent. As a result of this, the cover is placed in a third position by means of a spring, which position is intermediate between the opened first and the closed second position; the video disc being brought to a standstill without enabling the cover 5 to be opened completely. For a description of the safety mechanisms which are suitable for use in a video disc player in accordance with FIG. 1, reference is made to U.S. Pat. No. 4,032,971, issued June 28, 1977, U.S. Pat. No. 4,092,671, issued May 30, 1978, and allowed patent application Ser. No. 783,840, filed Apr. 11, 1977 on which the issue fee has been paid.

On the cover 5 three mounting hooks 22 are fitted for resiliently mounting the stabilizing disc 8, also see FIG. 2 in which for the sake of simplicity only one of the mounting hooks 22 is shown. The hook substantially consists of a strip of resilient steel bent to an L-shape, from which a leaf spring 23 is stamped, which with one of its short sides is connected to the remaining part of the mounting hook. The stabilizing disc is suspended in the mounting hooks 22 with three mounting cams 24. This can be effected simply by exerting pressure on the stabilizing disc 8, so that the mounting hook is slightly deformed so as to engage with the mounting cam. The leaf spring 23 then bears against the underside of the stabilizing disc 8, while the mounting cam 24 has such a movability in the mounting hook 22 that it is bodily and axially movable to a limited extent relative to the cover 5 against the action of the leaf spring 23. On its side which faces the stabilizing disc the cover has an upright circular rim 25 in which three recesses 26 are formed for the mounting hooks. Mounting of the mounting hooks is effected by means of two screws 27. Between the cover 5 and the stabilizing disc 8 a closing plate is mounted on the uptight rim 25. One of the screws needed for this, bearing the reference numeral 29, is shown. The closing plate 28 has slots 30 for the passage of the leaf springs 23 of the mounting hooks 22. In the center of the closing plate 28 a central opening 31 is formed, which is coaxial with the central opening 32 in the stabilizing disc 8 and with a disc loading device 33. Said device is mounted with play in a mounting ring 34, which is secured to the cover 5 by means of screws, not shown. The disc loading device serves for the co-operation with an annular magnet 35 which is mounted in the drive spindle 4 for pressing the video disc 1 in position on the conical outer surface of the drive spindle. The location where the mounting ring 34 is secured to the cover 5 is externally covered by an ornamental plate 36.

Near the central opening 32 the stabilizing disc 8 has an upright rim 37. In this rim an air inlet restriction is formed in the form of a duct 38 for during playing of the video disc admitting an air stream, which is restricted to a specific magnitude between the stabilizing disc and the rotating video disc and thus locally creating a partial vacuum. Air-valve means are provided in the form of a valve body 39 and a valve seat 40 for the closure of an air by-pass passage during playing of the video disc and for opening the air by-pass passage when playing of the video disc is discontinued. Thus, when playing is discontinued, an increased air stream can be admitted between the stabilizing disc and the rotating video disc for at least largely eliminating the locally prevailing subatmospheric pressure and preventing the video disc from being drawn along when the stabilizing disc moves when the cover is being opened.

On the deck plate 3 there are located three stops 41 which when the cover is closed against the spring force of the leaf springs 23 co-operate with the stabilizing disc 8 and position said disc at the correct height above the deck plate and above the video disc 1 which has been put on. The air-valve means 39 and 40 are respectively connected to the stabilizing disc 8 and the cover 5. When the cover is closed the air bypass passage is closed by the valve body and the valve seat. When the cover is open the air by-pass passage between the valve body and the valve seat is open as a result of the axial displacement of the stabilizing disc 8 relative to the cover. The valve body 39 has the form of a frustro conical body and is manufactured from a flexible plastic. With its free edge 42 it co-operates with a valve seat 40, which is constituted by a flat portion of the closing plate 28.

The operating of the invention will now be explained in more detail with the aid of FIGS. 3 and 4, which relate to a video disc player similar to that of FIG. 1 and which is equipped with a cover 43, a stabilizing disc 44 which is suspended in mounting hooks 45 and is pressed down against stop pins 47 on a deck plate 48 by means of springs 46. A video disc 49 is placed on a drive spindle 50 and is pressed against it by means of a disc loading device 51. On the stabilizing disc 44 a valve body 52 manufactured from an elastic plastic is mounted, which body co-operates with an annular sealing surface 53 of the cover 43. The stabilizing disc has a central opening 54 which is coaxial with a central opening 55 of the valve body 53. In the upright ring 56 of the stabilizing disc 44 near its central opening 54 a duct 57 is formed, which functions as air inlet restriction.

The air circulation during rotation of the video disc 49 is indicated by means of arrows in FIGS. 3 and 4. Between the video disc 49 and the facing side of the stabilizing disc 44 an outwardly directed air stream is produced by centrifugal forces. The space between these two discs has a slightly conical shape, so that the distance between the video disc and the stabilizing disc decreases towards the outside. The air inlet restriction 57 communicates with the space between the stabilizing disc 44 and the cover 43, so that from the space between them air can fleed to the space between the video disc and the stabilizing disc. The air inlet restriction has such a previously calculated size, that the air flowing through it meets with a flow resistance of such a magnitude that between the stabilizing disc and the rotating video disc a sub-atmospheric pressure of a specific desired magnitude results.

After unlatching of the cover the situation of FIG. 4 is obtained, in which the cover 43 has been moved upwards over some distance relative to the stabilizing disc 44. The disc loading device 51 still bears on the video disc 49 (suspension of the disc-loading device not shown for clarity of the drawing). Between the edge 58 of the valve body 52 and the sealing surface 53 an annular opening exists which constitutes an air by-pass passage having a cross-section which is several times greater than the cross-section of the air inlet restriction 57. As a result of this air which is located between the stabilizing disc 44 and the cover 43 can pass to the space between the stabilizing disc 44 and the video disc 49 via the central opening 55 of the valve body 52 without meeting with any significant flow resistance. This means that the pressure in this space becomes equal to the pressure of the air between the stabilizing disc 44 and the cover 43, i.e. the ambient pressure.

The small projections 59, four of which are arranged around the opening 54 in the stabilizing disc 44, serve to ensure that for example a deformation of the stabilizing disc by external forces, cannot cause the air stream between the video disc and the stabilizing disc to be cut off. Should the opening 54 be closed completely, a suction effect is produced which is such that the magnetic disc loading device 51 is released, so that the rapidly rotating disc and thus the disc player could be damaged.

What is claimed is:

1. A video disc player for playing back round rapidly rotating video discs and comprising:

a housing with a deck plate, a motor-driven drive spindle, which projects from the deck plate, for rotating a video disc parallel to the deck plate, a cover movable between an open first position and a closed second position, a stabilizing disc attached to said cover and which is movable between a first and a second position corresponding to said first and second positions of said cover and which in the last-mentioned position at least substantially covers a video disc placed on the drive spindle in a position proximate thereto, for stabilizing the shape of a video disc during rotation, which stabilizing disc in its second position extends substantially perpendicularly to the drive spindle axis and is disposed at a small distance from a video disc which is disposed on the drive spindle, means comprising at least one air inlet restriction for, during playback of a video disc admitting an air stream which is limited to a specific magnitude between the stabilizing disc and the rotating video disc and thus reducing the air pressure between said rotating video disc and said stabilizing disc, air-valve means comprising a valve body and a valve seat for closing an air by-pass passage during playing of a video disc when said cover is closed and for opening the air by-pass passage when said cover is opened and playing of a video disc is discontinued, so as to admit an increased air stream between the stabilizing disc and a rotating video disc in order to substantially increase the pressure between said rotating video disc and said stabilizing disc and to prevent the video disc from being drawn along when the stabilizing disc is moved from its second to its first position.

2. A video disc player as claimed in claim 1, in which the stabilizing disc is mounted in a cover, which is movable between an open position and a closed position, so that said disc is axially movable to a limited extent against spring force, and a plurality of stops are disposed on the deck plate for, when the cover is closed, co-operating with the stabilizing disc against the spring force, which disc is movable over some distance, characterized in that said air-valve means are connected both to the stabilizing disc and the cover, the valve body and the valve seat closing the air by-pass passage when the cover is closed and the air by-pass passage between the valve body and the valve seat being opened when the cover is opened as a result of the axial movement of the stabilizing disc relative to the cover.

3. A video disc player as claimed in claim 2, characterized in that the valve body consists of a flexible plastic member which co-operates with a contact surface which is connected to the cover by an annular sealing surface.

* * * * *